No. 629,829.  
H. G. TIDEMANN.  
HAND HOLE PLATE.  
(Application filed Oct. 14, 1898.)  
(No Model.) Patented Aug. 1, 1899.  
3 Sheets—Sheet 1.
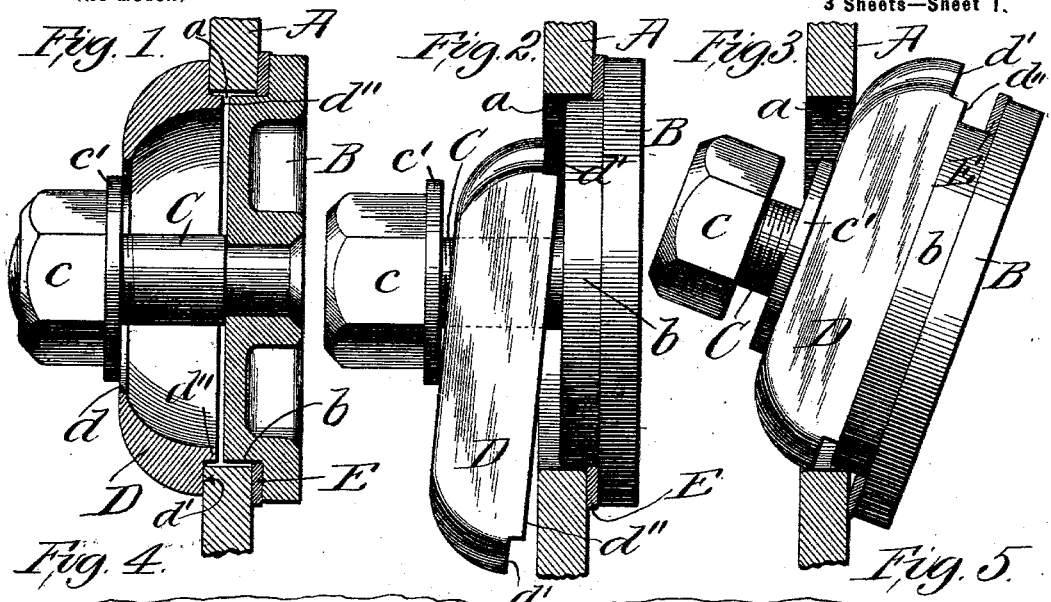
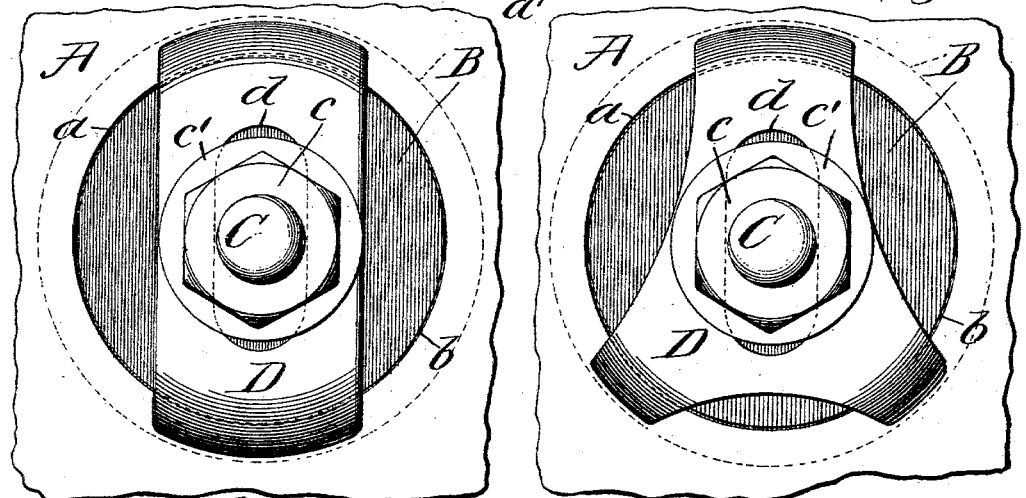
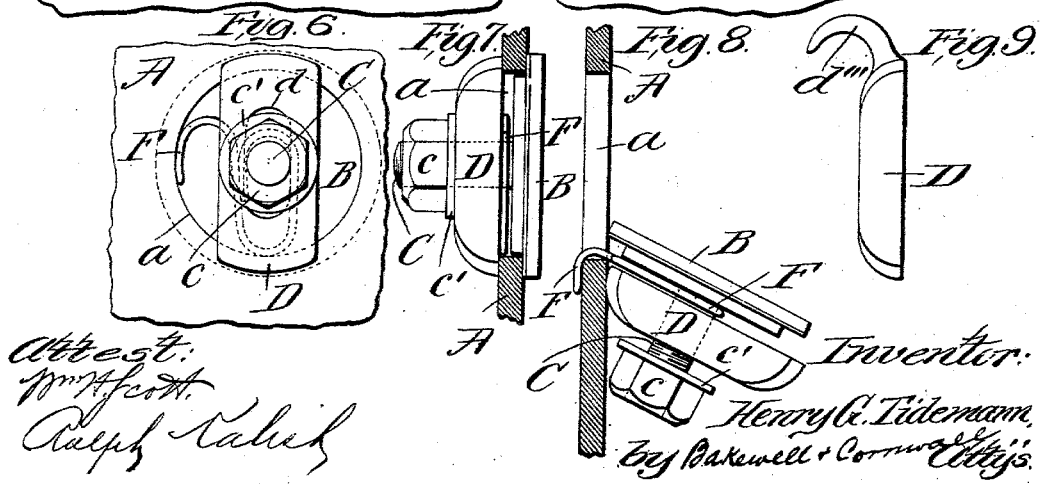
Inventor:
Henry G. Tidemann
By Bakewell & Cornwall Attys.
Attest:

No. 629,829. Patented Aug. 1, 1899.
H. G. TIDEMANN.
HAND HOLE PLATE.
(Application filed Oct. 14, 1898.)
(No Model.) 3 Sheets—Sheet 2.
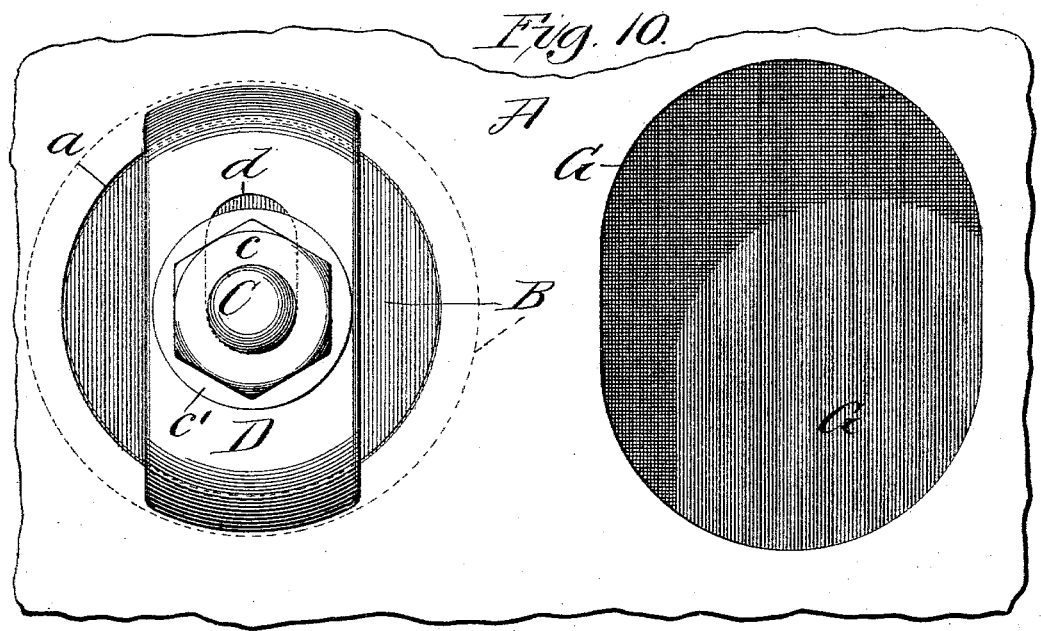
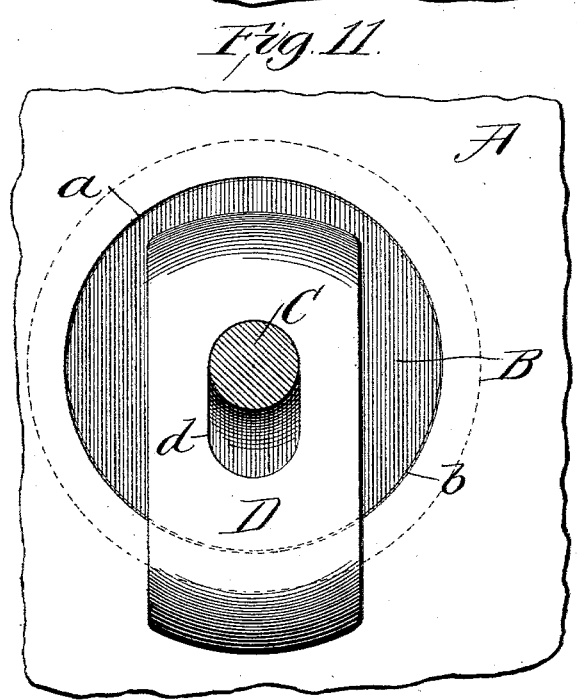
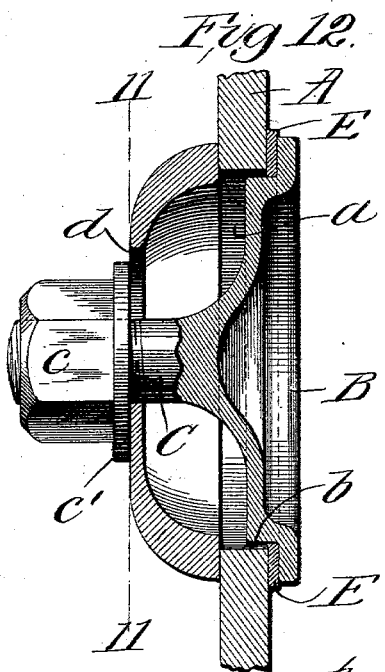
Inventor:
Henry G. Tidemann,
by Bakewell & Cornwall,
Attys.
Attest No. 629,829. Patented Aug. 1, 1899.
H. G. TIDEMANN.
HAND HOLE PLATE.
(Application filed Oct. 14, 1898.)

(No Model.) 3 Sheets—Sheet 3.

Attest:
Wm H Scott
Ralph Kalish

Inventor:
Henry G. Tidemann,
By Bakewell & Cornwall
Attys.

THE NORRIS PETERS CO., PHOTO-LITHO., WASHINGTON, D. C.

UNITED STATES PATENT OFFICE.

HENRY G. TIDEMANN, OF ST. LOUIS, MISSOURI.

HAND-HOLE PLATE.

SPECIFICATION forming part of Letters Patent No. 629,829, dated August 1, 1899.

Application filed October 14, 1898. Serial No. 693,535. (No model.)

*To all whom it may concern:*

Be it known that I, HENRY G. TIDEMANN, a citizen of the United States, residing at the city of St. Louis, State of Missouri, have invented a certain new and useful Improvement in Hand-Hole Plates, of which the following is a full, clear, and exact description, such as will enable others skilled in the art to which it appertains to make and use the same, reference being had to the accompanying drawings, forming part of this specification, in which—

Figure 13:
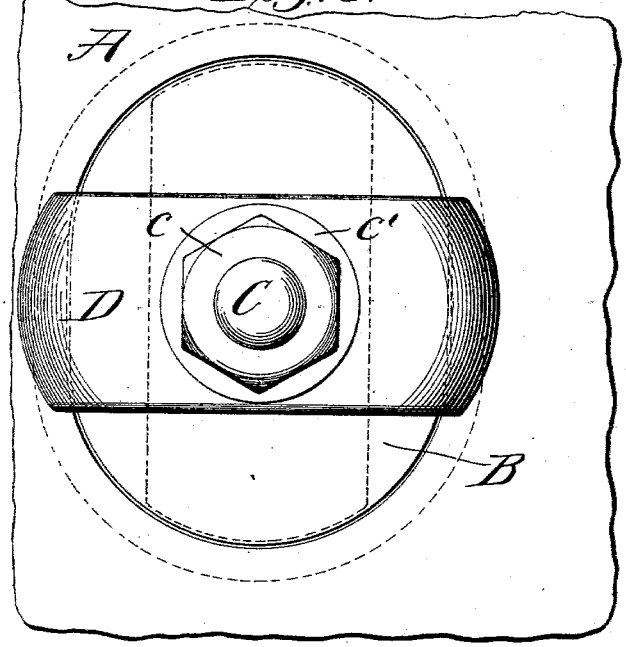
Figure 14:
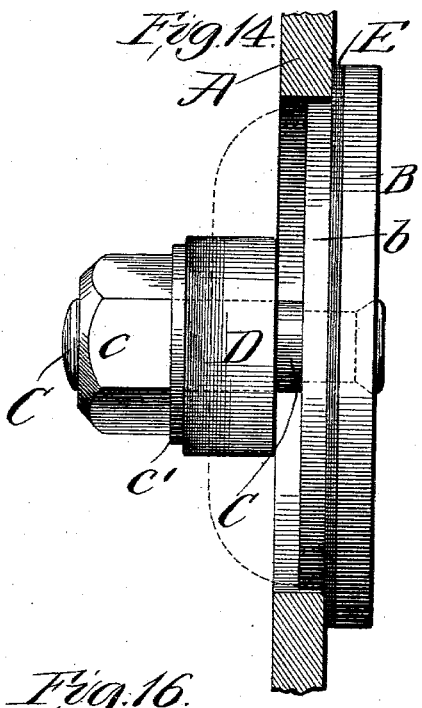
Figure 15:
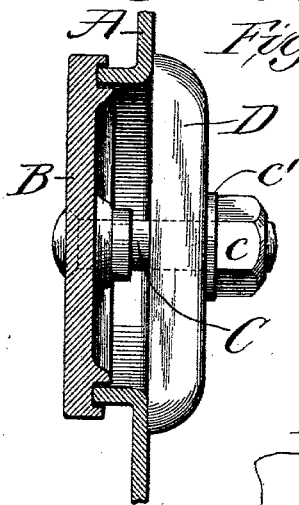
Figure 16:
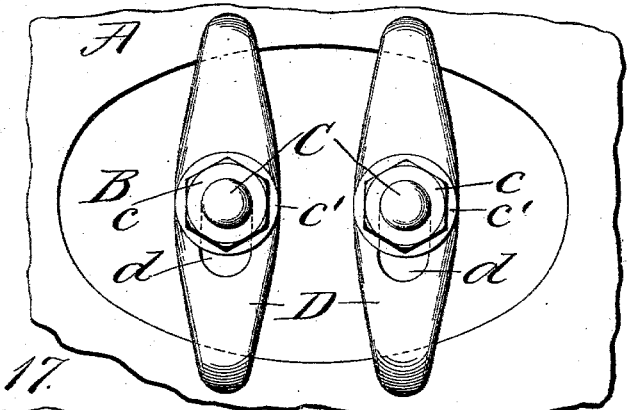
Figure 17:
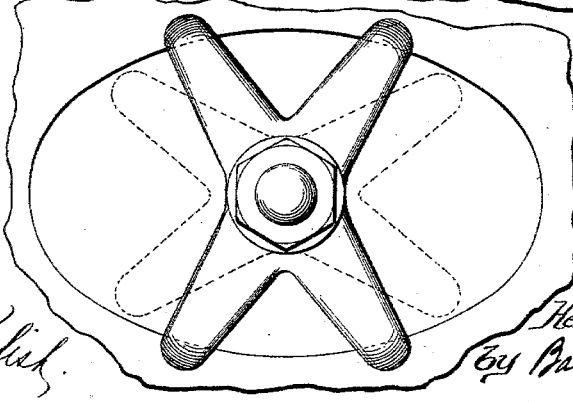

Figure 1 is a sectional view of my improved hand-hole plate, showing the same clamped in position upon a section of a boiler or other vessel. Fig. 2 is a side elevational view of my improved hand-hole plate, illustrating the initial position taken by the parts preparatory to removing the same from a boiler or other vessel. Fig. 3 is a similar view with the parts adjusted to another position, illustrating the manner in which the hand-hole plate is removed from a boiler or other vessel. Fig. 4 is a front elevational view of my improved hand-hole plate, showing the same in a locked or clamped position upon a vessel. Fig. 5 is a similar view illustrating a slight modification in the shape of the yoke or clamping-block. Fig. 6 is a front elevational view, on a reduced scale, of my improved hand-hole plate, illustrating a slight modification wherein a suspension-hook is secured to the hand-hole plate, whereby said hand-hole plate may be suspended within the vessel when the same is unclamped and removed from the hand-hole which it previously covered. Fig. 7 is a side elevational view of the same in a clamped position. Fig. 8 is a side elevational view of the same in an unclamped position, illustrating the manner in which the hook referred to in Fig. 6 suspends the hand-hole plate inside the vessel. Fig. 9 is a side elevational view of the clamping-yoke, illustrating a slight modification wherein the suspending-hook is formed integral therewith. Fig. 10 is in part a front elevational view of a portion of a boiler or other vessel and in part a front elevational view of a hand-hole plate clamped in position on said vessel, the construction of the yoke or clamping-block being slightly modified with reference to the slot formed therein. Fig. 11 is a sectional view on line 11 11, Fig. 12, the clamping-block being in an adjusted or initial position preparatory to removing the hand-hole plate from the vessel. Fig. 12 is a sectional view of the hand-hole plate clamped in position upon the vessel. Figs. 10, 11, and 12 illustrate the same construction of my hand-hole plate and are therefore companion views and should be read together. Figs. 13 and 14 illustrate views in plan and side elevation, respectively, of another slightly-modified form of hand-hole plate. Figs. 15 and 16 illustrate views in sectional elevation and plan, respectively, of another slightly-modified form of my improved hand-hole plate; and Fig. 17 is a plan view of still another slightly-modified form of my improved hand-hole plate.

This invention relates to a new and useful improvement in hand-hole plates, or, more correctly speaking, to the manner in which hand-hole plates are clamped in position or removed from boilers or other vessels.

The objects of this present invention are to construct a simple, inexpensive, and reliable hand-hole plate provided with means whereby said hand-hole plate may be readily clamped into position upon and removed from a boiler or other vessel without necessitating disassembling of the parts, thus obviating the loss or misplacement of any of said parts and facilitating its adjustment into and out of position, and to provide means attached to said hand-hole plate for suspending the same away from the hand-hole when the plate is removed from the opening of the boiler or other vessel.

With these objects in view the invention consists, first, in the novel construction of the plate proper, in combination with its carried shank, which may be formed of separate parts or integral, as desired; second, in the novel construction of the clamping-yoke, which is provided with a suitable slot, whereby said yoke may be so adjusted as to permit the entire hand-hole plate to be slipped into the hole in the vessel which it is designed to cover, said yoke being also so constructed that its length in one direction is greater than the opening with which it coöperates and its breadth in another direction is less than said opening, whereby when adjusted in a clamped position said yoke cannot be forced into the opening of the hand-hole plate which it is intended to cover; but when adjusted to an unclamped position, its breadth being narrower than said opening, it may be passed through said opening, this operation being accomplished without disassembling the parts; third, in the novel construction employed, whereby the hand-hole plate may be supported or suspended within the boiler or vessel when the same is not in position in the opening, and, finally, the invention consists in the novel construction, arrangement, and combination of the several parts, all as will hereinafter be described, and afterward pointed out in the claims.

In the drawings, A indicates a portion of a boiler-plate or the like with a hand-hole or opening $a$ for well-known purposes.

B indicates the hand-hole plate, which may be formed by casting, stamping, or by drop-forging, as is obvious.

C indicates a shank secured to plate B in any well-known manner, preferably, however, by riveting, although when desired this shank and plate may be formed integral, which can be readily done by either casting or stamping or forging.

D indicates a yoke or clamping-block provided with an elongated opening or slot $d$. Through this slot $d$ shank C passes, and outside the yoke D and coöperating with the end of shank C is the clamping means, preferably in the form of a nut and washer $c$ and $c'$, respectively.

In the construction shown in Figs. 1, 2, 3, 4, and 5 I desire to form the yoke with an offset $d'$ upon that part of its inner face which impinges against the boiler-plate A. This offset provides a shoulder $d''$, which when the yoke is in a central or clamping position extends a slight distance into the opening $a$, whereby said yoke is easily adjusted to its proper position for clamping, as if this face which rests against the boiler-face were perfectly flat care would have to be taken in placing said yoke in position in order that a desirable symmetry be produced.

E indicates a gasket which is interposed between a flange on the plate B and the boiler-plate A. By forming the plate B, as shown in the drawings, with a reduced portion $b$, which extends some distance into the opening $a$, the gasket is prevented from being crowded inwardly and pressed into said opening. Furthermore, this portion $b$ acts practically as a support and centering medium for said gasket.

When my improved hand-hole plate is in position covering the opening $a$ in a boiler or the like, the flange of the plate B and the gasket E contact with the inner face of said boiler and the portion $b$ extends some distance into the opening $a$, as before stated, and its (the plate's) carried shank C, which also passes through said opening, protrudes outwardly, and upon this protruding portion is located the yoke D—that is, the shank passes through the slot $b$—and outside said yoke is secured the clamping means, which is, as before mentioned, preferably a washer and nut. It is now obvious that by tightening said nut the yoke and plate will be drawn together, firmly clamping the hand-hole plate as an entirety to the boiler. A, the gasket hermetically sealing the opening $a$, as is usual.

To remove the hand-hole plate, all that is necessary is to unscrew the nut $c$ a short distance and slide the yoke until the end of the slot $d$ contacts with the shank (see Fig. 2) and then push or tilt the entire assembly of parts inwardly, (see Fig. 3,) whereupon it will be seen that the narrow width of the yoke permits said assembly of parts to be forced through the opening $a$; they (the several parts) all remaining together, and said hand-hole plate will be retained inside the vessel until it is again desired to effect a closure, when the said assembly of parts by passing the same from hole to hole may be raised, as is the usual practice, until the proper opening is reached, when it may be again restored to its proper closing position by first inserting the nut and shank, together with the yoke, through the opening until the parts occupy the position shown in Fig. 3. Then the parts are adjusted to the position shown in Fig. 2 and then to position shown in Fig. 1, or, in other words, the movement of the parts being just the reverse taken by said parts when the opening is being uncovered.

When it is desired to suspend the hand-hole plate inside the vessel after it has been removed from its opening, I may employ a suitable hook F, secured to the hand-hole plate or any of its carried parts, the same being preferably formed and located as illustrated in Figs. 6, 7, and 8, the latter of which shows the manner in which this object is accomplished; or, if desired, I may form the hook integral with any of the parts forming this hand-hole plate as an entirety—as, for instance, at $d'''$ in Fig. 9.

In Figs. 10, 11, and 12 I have illustrated two slight modifications, the first being in the manner in which the slot $d$ is located, the same being so arranged as to have one end of the slot form a limit of a movement of the yoke in its central or clamped position, as is illustrated in Fig. 10, or, in other words, the slot $d$ starts from the center of the yoke and is elongated or extends toward one of its ends, whereby when the yoke is moved so as to occupy a central or correct position further movement in that direction is impossible, as the ends of the slot will contact with the shank. This construction obviates the necessity of forming the offsets $d'$ and shoulder $d''$, respectively, referred to in Figs. 1 to 5, inclusive. The second modification of said Figs. 10, 11, and 12, particularly the latter, simply illustrates that the shank and plate may be formed in one piece, which will be readily understood.

In boilers or the like wherein numerous hand-holes and their respective plates are employed it is desirable for economical and other well-known reasons to form the hand-hole circular, and at various intervals, depending upon the size of the vessel and number of holes, are formed elliptic or elongated openings for the purpose of inserting into the vessel from the exterior the ordinary plates B should the same become broken or out of order, said plates being of greater diameter than their respective openings, which would prevent their being inserted through these last-mentioned openings, and when said plates B are inserted into said elliptic openings they are then passed from hole to hole until the proper position is reached, as is well understood. In this connection I have illustrated said elliptic openings G in Fig. 10, the object of which illustration is to show that my improved hand-hole plate as an entirety without disassembling is susceptible of being passed through said opening in like manner and for the same purpose as the ordinary hand-hole plate before mentioned.

The illustration in Fig. 5 is only for the purpose of showing that various shapes of the yoke may be employed in carrying out my invention. As is shown, three bearing-points are employed, though obviously the exact shape is immaterial as long as the essential proportions are adhered to.

With reference to the slot $d$ it may be stated that, if desired, instead of forming the slot as shown in the drawings the opening could as well be cylindrical and of greater diameter than the shank, but of less diameter than the washer $c'$, which would perform the same function of permitting the adjustment of the yoke.

The illustrations in Figs. 13 and 14 provide for a construction applicable to elliptic or elongated hand-holes wherein the slot $d$ is omitted, it being obvious that the same is unnecessary, for the reason that when the yoke is in the position shown in full lines, said yoke being longer than the shortest diameter of said elliptic hand-hole, it will when clamped impinge against the sides of the vessel to each side of the narrowest dimension of said elliptic opening, and when the parts are adjusted to the position illustrated in dotted lines said yoke will be shorter in length than the greatest diameter of said elliptic opening, whereupon it will be seen that said yoke may be slipped through said opening, and thus accomplish the same desired end as is accomplished in the constructions illustrated in Figs. 1 to 12, inclusive.

In the constructions illustrated in Figs. 15 and 16 I provide a manhole wherein I have merely duplicated the slotted yoke, which are susceptible of being so adjusted as to enable said yokes and their clamping means to be slipped inside the vessel, as will be clearly understood.

Fig. 17 illustrates a construction adapted for use upon a manhole wherein the yoke is of spider form and is, as is the yoke in the construction shown in Figs. 13 and 14, designed to be so adjusted when in a clamping position on the vessel that its length will be greater than the shorter diameter of the manhole, and when adjusted to an unclamped position, or the position shown in dotted lines, the length of said yoke or spider will be less than the length of the manhole and may be slipped or passed through the opening it is designed to cover without necessitating the disassembling of the parts.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. In combination with a vessel formed with a circular hand-hole, or opening, of a circular-shaped hand-hole plate therefor, a shank rigidly secured to said circular hand-hole plate, and means for clamping said hand-hole plate to said vessel, said means being susceptible of being passed through the opening which said hand-hole plate is designed to cover without necessitating the detachment of any of said means from said hand-hole plate; substantially as described.

2. In combination with a hand-hole plate, of a shank carried thereby, a yoke, longitudinal slot formed in said yoke, and through which slot said shank passes, thereby permitting lateral movement of said yoke relative to said shank, whereby said yoke can be passed through the opening which said hand-hole plate covers, and means for engaging said yoke and said shank for clamping said hand-hole plate in position; substantially as, and for the purpose specified.

3. In combination with a vessel formed with a circular opening of a circular-shaped hand-hole plate therefor, a shank secured to said hand-hole plate, a yoke, a longitudinal slot formed through said yoke, said slot being designed to permit said shank to pass therethrough, and by which construction lateral movement of the yoke relative to said shank is permitted, whereby said yoke can be passed through the aforesaid circular opening which the hand-hole plate covers, and means coöperating with said shank and said yoke for clamping the same in position; substantially as, and for the purpose specified.

4. In a hand-hole plate, the combination with a shank, of a yoke, a longtiudinal slot formed in said yoke, said slot being for the purpose of permitting said shank to pass therethrough and have a lateral adjustment relative to said yoke, whereby when said yoke is thus laterally adjusted, the same can be passed through the opening which said hand-hole plate is designed to cover, means for centering said yoke, relative to the opening it spans, when in a clamped position, or in a position ready to be clamped, and means coöperating with said shank and yoke, for clamping said parts in position; substantially as described.

5. In a device of the character described, the following elements, in combination, a hand-hole plate B, a shank C, a yoke D, having a longitudinal slot $d$, formed therein, a shoulder, or inwardly-extending portion $d''$, and means for coöperating with said yoke and said shank for clamping said hand-hole plate and said yoke in position; substantially as described.

6. In a device of the character described, the following elements in combination, a hand-hole plate B, a shank C, a yoke D, having a longitudinal slot $d$ formed therein, a shoulder, or inwardly-extending portion $d''$, and a nut $c$ which coöperates with said shank, and said yoke, for clamping said hand-hole plate and said yoke in position; substantially as described.

In testimony whereof I hereunto affix my signature, in the presence of two witnesses, this 10th day of October, 1898.

HENRY G. TIDEMANN.

Witnesses:
HUGH K. WAGNER,
WM. H. SCOTT.